United States Patent [19]

Hurst et al.

[11] E Re. 30,526

[45] Reissued Feb. 24, 1981

[54] BABY SOOTHER

[75] Inventors: Eric K. Hurst, London; Ronald K. Moore, Kempsey, both of England

[73] Assignee: Lewis Woolf Griptight Limited, Birmingham, England

[21] Appl. No.: 30,227

[22] Filed: Apr. 16, 1979

Related U.S. Patent Documents

Reissue of:

[64] Patent No.: 3,886,949
Issued: Jun. 3, 1975
Appl. No.: 426,678
Filed: Dec. 12, 1973

[51] Int. Cl.[3] ..... A61J 17/00

[52] U.S. Cl. ..... 128/360

[58] Field of Search ..... 128/359, 360, 251

[56] References Cited

U.S. PATENT DOCUMENTS

| | | | |
|---|---|---|---|
| D. 194,769 | 3/1963 | Moffat | D83/3 |
| D. 219,251 | 11/1970 | Chrones | D24/5 |
| 1,467,904 | 9/1923 | McOmish | 128/360 |
| 1,656,833 | 1/1928 | Shutze | 128/359 |
| 2,699,785 | 1/1955 | Allen | 128/360 |
| 2,825,335 | 3/1958 | Natonek | 128/360 |
| 3,610,248 | 10/1971 | Davidson | 128/360 |
| 3,662,756 | 5/1972 | Hakim | 128/360 |

FOREIGN PATENT DOCUMENTS

| | | | |
|---|---|---|---|
| 37457 | 11/1970 | Australia | 128/360 |
| 534410 | 8/1958 | Belgium | 128/359 |
| 811262 | 8/1951 | Fed. Rep. of Germany | 128/360 |
| 818830 | 10/1951 | Fed. Rep. of Germany | 128/360 |
| 2037836 | 2/1972 | Fed. Rep. of Germany | 128/359 |
| 1102006 | 10/1955 | France | 128/359 |
| 33-13830 | 10/1958 | Japan | 128/360 |
| 44-3108 | 2/1969 | Japan | 128/360 |
| 279570 | 11/1927 | United Kingdom | 128/360 |
| 536196 | 8/1940 | United Kingdom | 128/360 |
| 525793 | 9/1940 | United Kingdom | 128/360 |
| 625586 | 6/1949 | United Kingdom | 128/360 |

*Primary Examiner*—Robert W. Michell
*Assistant Examiner*—Thomas Wallen
*Attorney, Agent, or Firm*—Finnegan, Henderson, Farabow, Garrett & Dunner

[57] ABSTRACT

A baby soother comprising a shield carrying a teat and having at the side remote from the teat a handle which is connected to the shield and incorporating an integral hinge.

4 Claims, 3 Drawing Figures

BABY SOOTHER

Matter enclosed in heavy brackets [ ] appears in the original patent but forms no part of this reissue specification; matter printed in italics indicates the additions made by reissue.

This invention relates to baby soothers of the kind comprising a member which acts as a shield carrying a teat and also having a handle extending in a direction away from the teat.

The object of the invention is to provide a baby soother of this kind in a convenient form.

In accordance with the present invention, a baby soother comprises a shield carrying a teat extending from one side thereof, the shield also having on its side remote from the teat, a handle which incorporates a hinge whereby a main portion of the handle can be hinged relatively to a portion of the handle fixed to the shield.

Figure 1:
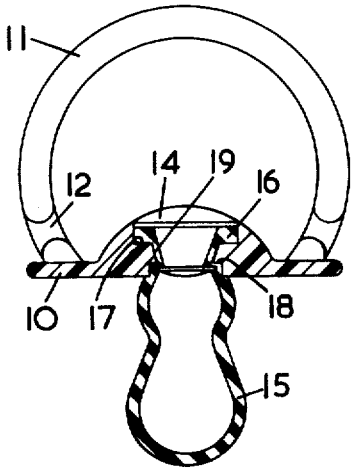
Figure 2:
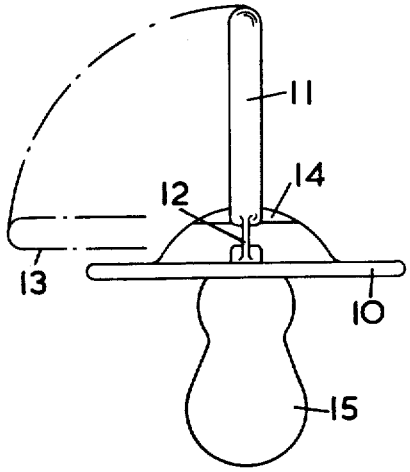
Figure 3:
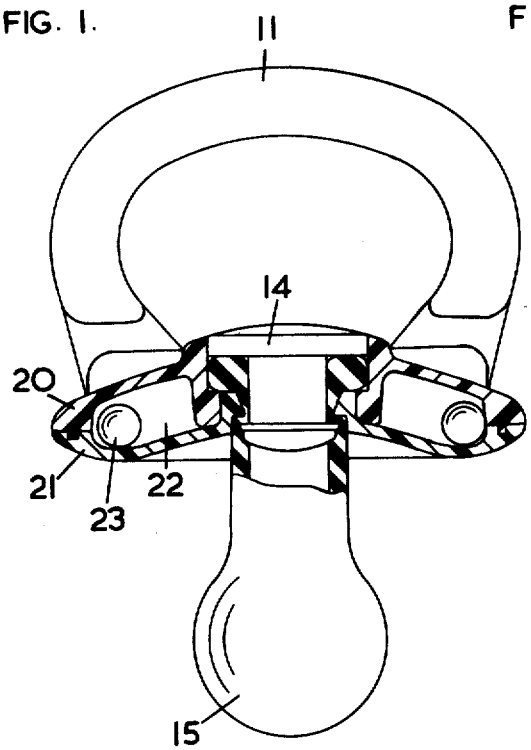

The invention will now be described by way of example with reference to the accompanying drawings in which FIG. 1 is a cross-sectional view of a baby soother constructed in accordance with the invention, FIG. 2 is a side elevation view and FIG. 3 is a cross-sectional view of an alternative construction.

The baby soother illustrated comprises three components. The main component is a combined shield 10 and handle 11, which is formed as a single part preferably by a moulding process from a plastics material such as polypropylene.

The shield 10, is a substantially flat round disc with an enlarged boss on one side having a stepped bore, in its centre. The handle 11 is generally arcuate and joins the shield 10, on the side thereof on which the centre boss is formed. The ends of the handle join the shield at positions diametrically opposite to each other. The handle is of circular cross-section but near its two junctions with the shield 10, it has two narrow neck portions 12. These serve as hinge connections between an outer main portion of the handle and short portions connected to the shield 10 respectively. The hinge portions 12 have a degree of resilience so that the handle tends to stand up from the shield 10 as shown in the drawings. However, the handle can be hinged down into the position indicated in dotted lines at 13 in FIG. 2.

In the bore in the boss of the shield 10 are located a plug 14 and the open end of a resilient teat 15. Such open end is provided with a thickened bead 16 which locates on a shoulder 17 formed in the bore of the shield 10. The plug is double headed and has a tapered shank joining the two heads, one of which is however, larger than the other. The flat surface under the larger of the heads engages the bead 16, of the teat and secures it against its shoulder 17 in the shield 10. The smaller head of the plug 14 traps the teat against another shoulder 18 in the bore of the shield 10, such shoulder 18 being presented in the opposite direction to the shoulder 17. Between the two shoulders 17 and 18 there is defined a frusto conical section 19 of the bore which also serves to trap the teat and force it against the correspondingly tapered shank of the plug 14.

The bulbous end of the teat 15 extends from the shield away from the handle 11.

The boss of the shield 10 and the larger head of the plug 14, which is domed, form a substantially continuous approximately part-spherical surface so that it is almost impossible to detach the plug from the shield and thus separate the three components of the soother.

To assemble the parts, the teat is introduced into the bore of the boss of the shield 10 and the plug is then forced into place to trap it. Since the smaller end of the plug 14 is also headed, as described, this resists separation of the components.

In the alternative construction shown in FIG. 3, the shield is made from two parts 20, 21 secured together at their inner and outer peripheries. A space 22 is defined between these parts and in this are loosely carried a number of glass beads 23 or other objects intended to provide a rattle effect when the soother is moved.

The two parts 20, 21 are preferably welded together at their edges and both are plastics mouldings. The handle 11 is formed integrally with the part 20 of this shield.

We claim:

[1. A baby soother having a shield with two sides, a resilient teat on one side and a handle on the other side, comprising an integral shield and handle structure, said handle being substantially arcuate in shape, the arcuate shaped handle having ends integral with said other side of said shield, said ends being joined to said shield at positions diametrically opposite to each other, said handle being substantially circular in cross-section throughout most of its arcuate shape but having narrow neck portions adjacent each end but spaced from said other side of said shield to form integral resilient hinge means, said neck portion having a degree of resilience to cause the handle to normally stand up on said shield but permitting it to be hinged on the shield by the baby, said shield having a centrally disposed enlarged boss, said boss having a stepped bore therethrough extending from one side to the other, said bore having shoulders therein with the shoulders being disposed in the bore at the respective opposite sides of the shield, said resilient teat being hollow and having beads surrounding an open end thereof, said beads being adapted to interfit with said shoulders to hold said teat projecting from said one side of the shield, a double headed plug fitted into the open end of the teat situated in said bore, the head at one end of said plug being smooth and said plug having a shape fitting within and filling said bore, and said plug engaging the beads on the open end of the teat to hold them interfitted with said shoulders while the head on the other end of said plug holds the plug in place.]

[2. A baby soother as in claim 1 wherein the head at said one end of the plug is dome shaped and forms with said boss a substantially continuous partly spherical surface on said other side of the shield.]

[3. A baby soother as in claim 1 in which the shield has two parts secured together and between them is defined a space containing beads.]

*4. A baby soother having a shield with two sides, a resilient teat on one side and a handle on the other side, comprising an integral shield and handle structure, said handle being substantially arcuate in shape, the arcuate shaped handle having ends integral with said other side of said shield, said ends being joined to said shield at positions diametrically opposite to each other, said handle being substantially circular in cross-section throughout most of its arcuate shape but having narrow neck portions adjacent each end but spaced from said other side of said shield to*

*form integral resilient hinge means, said neck portion having a degree of resilience to cause the handle to normally stand up on said shield but permitting it to be hinged on the shield by the baby, said shield having a centrally disposed enlarged boss, said boss having a stepped bore therethrough extending from one side to the other, said bore having shoulders therein facing the respective opposite sides of the shield, said resilient teat being hollow and having a single bead surrounding an open end thereof, said bead being adapted to interfit with said shoulder facing said other side of said shield to hold said teat projecting from said one side of the shield, a double headed plug fitted into the open end of the teat situated in said bore, the head at said open end of the teat being smooth and said plug having a shape fitting within and with said teat filling said bore, and said head at said open end of the teat engaging*

*the bead on the open end of the teat to hold said bead interfitted with said shoulder facing said other side of said shield while the head on the other end of said plug holds the plug in place by cooperating with the shoulder facing said one side of the shield.*

*5. A baby soother as in claim 4, wherein the head at said open end of said teat is dome shaped and forms with said boss a substantially continuous partly spherical surface on said other side of the shield.*

*6. A baby soother as in claim 4 in which the shield has two parts secured together and between them is defined a space containing beads.*

*7. A baby soother as in claim 4, wherein the head at said open end of said teat forms with said boss a substantially continuous surface on said other side of the shield.*

* * * * *